United States Patent
Subramanyam et al.

(10) Patent No.: US 10,027,801 B1
(45) Date of Patent: Jul. 17, 2018

(54) METHODS AND SYSTEMS FOR CONTROLLING INTER-AGENCY, INCIDENT SCENE COMMUNICATIONS

(71) Applicant: MOTOROLA SOLUTIONS, INC., Chicago, IL (US)

(72) Inventors: Srividya G. Subramanyam, South Barrington, IL (US); Thomas J. Senese, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/479,161

(22) Filed: Apr. 4, 2017

(51) Int. Cl.
  *H04M 11/00* (2006.01)
  *H04M 3/51* (2006.01)
  *H04W 4/021* (2018.01)
  *H04W 76/00* (2018.01)
  *H04W 4/08* (2009.01)
  *H04W 76/50* (2018.01)

(52) U.S. Cl.
  CPC ......... *H04M 3/5116* (2013.01); *H04W 4/021* (2013.01); *H04W 4/08* (2013.01); *H04W 76/007* (2013.01); *H04W 76/50* (2018.02)

(58) Field of Classification Search
  None
  See application file for complete search history.

(56) References Cited

U.S. PATENT DOCUMENTS

| | | | |
|---|---|---|---|
| 9,787,849 B2* | 10/2017 | Hoover | H04M 11/04 |
| 2005/0265256 A1* | 12/2005 | Delaney | H04W 92/02 |
| | | | 370/254 |
| 2008/0037461 A1* | 2/2008 | Biltz | H04L 41/0816 |
| | | | 370/328 |
| 2011/0230202 A1 | 9/2011 | Wood et al. | |
| 2015/0063202 A1* | 3/2015 | Mazzarella | H04B 7/18504 |
| | | | 370/316 |
| 2015/0111524 A1* | 4/2015 | South | H04W 4/22 |
| | | | 455/404.2 |

(Continued)

FOREIGN PATENT DOCUMENTS

| | | |
|---|---|---|
| CA | 2927122 | 4/2015 |
| JP | 6043030 | 4/2009 |

*Primary Examiner* — Stella Woo
(74) *Attorney, Agent, or Firm* — Michael Best & Friedrich LLP

(57) ABSTRACT

Methods and systems for controlling inter-agency, incident scene communications. One method includes storing, in a memory of a first dispatch device of a first agency, subscription information from a second agency. The method further includes establishing a geo-fence surrounding an incident and a talk group that allows communication devices to communicate with each other within the geo-fence. The method further includes identifying the second agency based on the geo-fence and transmitting a request to the second agency based on incident information and the subscription information. The request includes role information based on the incident information. The method further includes receiving information relating to an available communication device affiliated with the second agency. The available communication device is selected based on the role information. The method further includes transmitting instructions to the available communication device to control the available communication device to join the talk group.

20 Claims, 5 Drawing Sheets

(56) References Cited

U.S. PATENT DOCUMENTS

| | | | |
|---|---|---|---|
| 2015/0278732 A1* | 10/2015 | Fiedler | G06Q 10/06312 705/7.22 |
| 2017/0099579 A1* | 4/2017 | Ryan | H04W 4/022 |
| 2017/0142570 A1* | 5/2017 | Self | H04W 4/023 |

* cited by examiner

(12) United States Patent
US 10,027,801 B1

METHODS AND SYSTEMS FOR CONTROLLING INTER-AGENCY, INCIDENT SCENE COMMUNICATIONS

BACKGROUND OF THE INVENTION

Vehicle breakdowns, accidents, attacks on individuals and property, and other incidents may occur such that public safety personnel (for example, police officers, firefighters, and the like) are called to an incident area by a public safety agency (for example, a police department, a fire department, and the like) to help with an incident. Often times when handling an incident, public safety personnel of a public safety agency desire additional assistance from public safety personnel of another public safety agency.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
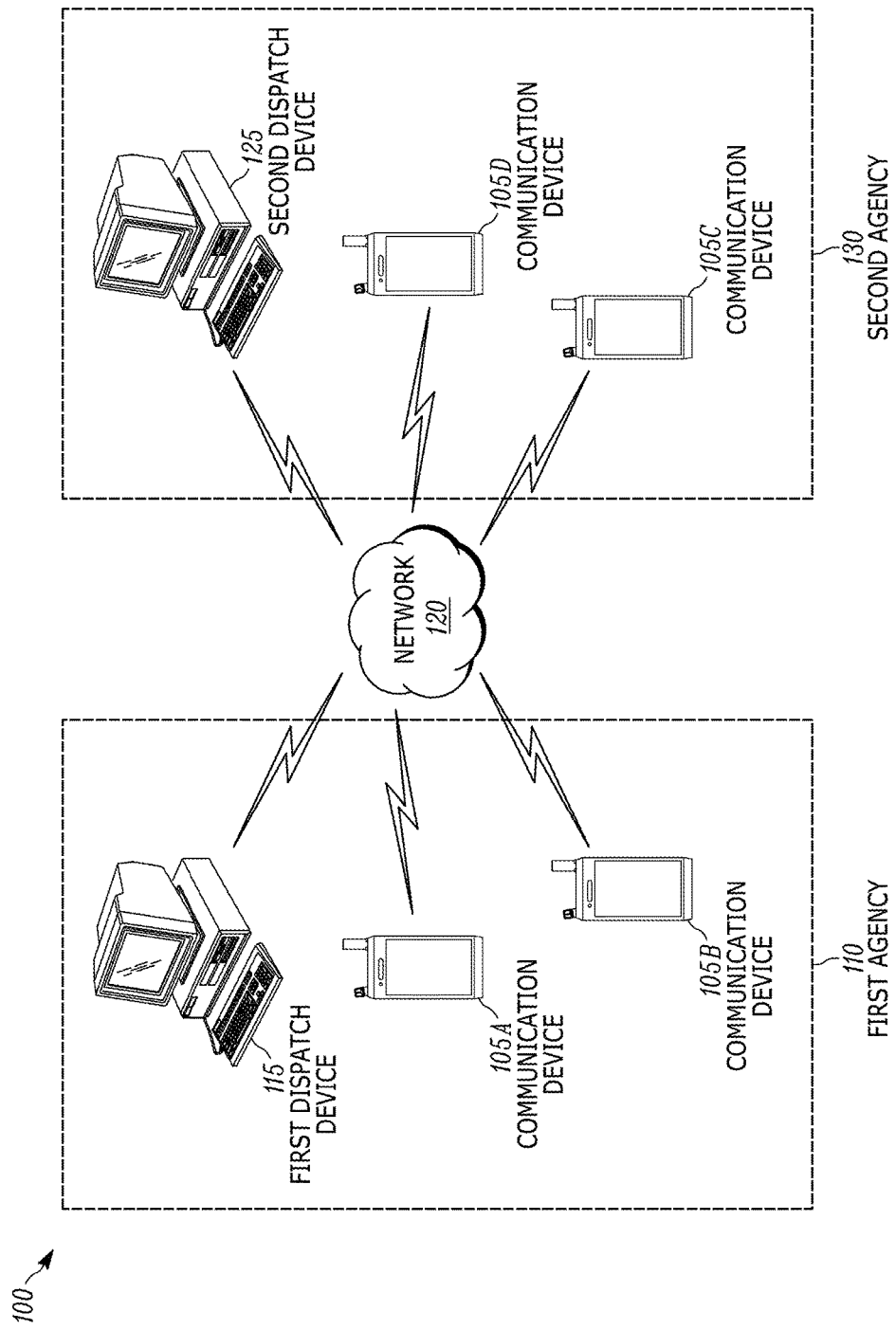
FIG. 1 is a diagram of a communication system according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of controlling inter-agency, incident scene communications. The method includes storing, in a memory of a first dispatch device of a first agency, subscription information from a second agency. The method further includes establishing, in response to an identification of an incident and with an electronic processor of the first dispatch device, a geo-fence surrounding the incident and a talk group that allows communication devices to communicate with each other within the geo-fence. The method further includes identifying, with the electronic processor, the second agency based on the geo-fence. The method further includes transmitting, from a network interface of the first dispatch device, a request to a second dispatch device of the second agency based on incident information and the subscription information. The request includes role information based on the incident information. The method further includes receiving, via the network interface of the first dispatch device from the second dispatch device, information relating to an available communication device affiliated with the second agency. The available communication device is selected based on the role information. The method further includes transmitting, by the network interface of the first dispatch device to the available communication device, instructions to control the available communication device to join the talk group.

Another embodiment provides a first dispatch device of a first agency. The first dispatch device includes a memory configured to store subscription information from a second agency. The first dispatch device also includes a network interface configured to communicate with a second dispatch device of the second agency. An electronic processor of the first dispatch device is configured to establish, in response to an identification of an incident, a geo-fence surrounding the incident and a talk group that allows communication devices to communicate with each other within the geo-fence. The electronic processor is further configured to identify the second agency based on the geo-fence, and to transmit, via the network interface, a request to the second dispatch device based on incident information and the subscription information. The request includes role information based on the incident information. The electronic processor is further configured to receive, via the network interface from the second dispatch device, information relating to an available communication device affiliated with the second agency. The available communication device is selected based on the role information. The electronic processor is further configured to transmit instructions, via the network interface, to the available communication device to control the available communication device to join the talk group.

Another embodiment provides a method of controlling inter-agency, incident scene communications. The method includes transmitting, from a network interface of a second dispatch device of a second agency, subscription information to a first agency. The method further includes receiving, via the network interface of the second dispatch device, a request from a first dispatch device of the first agency. The request is sent based on the subscription information and includes role information based on an incident, geo-fence information relating to a geo-fence surrounding the incident, and talk group information of a talk group that allows communication devices to communicate with each other within the geo-fence. The method further includes identifying, with an electronic processor of the second dispatch device, an available communication device affiliated with the second agency based on the role information. The method further includes transmitting, from the network interface of the second dispatch device, instructions to the available communication device to control the available communication device to join the talk group by using the talk group information.

FIG. 1 is a diagram of a communications system 100 according to one embodiment. In the example illustrated, the communication system 100 includes communication devices 105A, 105B, 105C, and 105D. In the following description, when explaining how a single communication device functions, a reference to communication device 105 is used. It is not necessary, however, that the communication devices 105A through 105D be identical. The communication devices 105A through 105D are merely examples. In some embodiments, the communication system 100 may include more or fewer communication devices 105 than illustrated in FIG. 1.

As indicated by FIG. 1, in some embodiments, the communication devices 105A and 105B are operated by members of a first agency 110 (for example, a public safety agency such as a police department, a fire department, and the like). The communication devices 105A and 105B may communicate with a first dispatch device 115 of the first agency 110 over a network 120. The communication devices 105A and 105B may also communicate with each other and with other devices (for example, devices outside the first agency 110) over the network 120. The network 120 may be a wired or a wireless communication network. All or parts of the network 120 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 120 may also include future developed networks. In some embodiments, the network 120 may also include a combination of the networks mentioned. In some embodiments, the communication devices 105A and 105B may communicate directly with each other using a communication channel or connection that is outside of the network 120. For example, the plurality of communication devices 105A and 105B may communicate directly with each other when they are within a predetermined distance from each other.

In some embodiments, the first dispatch device 115 is a computer maintained, for example, at a call center or public safety command center of the first agency 110. In some embodiments, the first dispatch device 115 may be a desktop computer, a laptop, a tablet, or another device capable of communicating over the network 120. The first dispatch device 115 may send information to and receive information from the communication devices 105A and 105B over the network 120. In some embodiments, the first dispatch device 115 controls communication between the communication devices 105A and 105B over the network 120 in accordance with talk group affiliation as explained in greater detail below.

The communication system 100 also includes a second dispatch device 125 of a second agency 130. The second dispatch device 125 is similar to the first dispatch device 115 and performs similar functions with respect to the second agency 130 as the first dispatch device 115 performs with respect to the first agency 110. For example, in some embodiments, the second dispatch device 125 controls communication between the communication devices 105C and 105D over the network 120 in accordance with talk group affiliation as explained in greater detail below. As indicated by FIG. 1, in some embodiments, the communication devices 105C and 105D are operated by members of the second agency 130. Similar to the communication devices 105A and 105B, the communication devices 105C and 105D may communicate with the second dispatch device 125, with each other, and with other devices over the network 120.

As illustrated in FIG. 1, the communication device 105 may be a handheld communication device, for example, a mobile telephone or other portable communication device, mobile radio, smart watch or other smart wearable, and may be located in or be a part of a drone or unmanned aerial vehicle, or may be another device configured to communicate over the network 120. In some embodiments, the communication device 105 may be a handheld radio carried by a public safety officer or first responder, such as a police officer. In some embodiments, the communication device 105 may be a mobile communication device mounted in or on a vehicle (for example, a police vehicle, an ambulance, or the like). In some embodiments, the communication device 105 may be a device maintained, for example, at a call center or public safety command center.

The first agency 110 and the second agency 130 shown in FIG. 1 are merely examples and have been simplified for the sake of explanation. In some embodiments, the first agency 110 and the second agency 130 include more or fewer communication devices 105. In some embodiments, the first agency 110 and the second agency 130 do not have the same number of communication devices 105. In some embodiments, the communication system 100 includes additional agencies that are similar to the first agency 110 and the second agency 130. For example, each additional agency may include its own dispatch device and communication devices. In some embodiments, each agency is associated with an area of land (in other words, a jurisdiction) such as a district, county, or state.

In some embodiments, the communication devices 105A through 105D are affiliated with or assigned to one or more talk groups associated with the network 120. As used herein, a talk group is a virtual radio channel (a shared channel selected from a group of channels or available frequencies) used for communication between a plurality of communications devices, other devices, or a combination thereof. A talk group may be defined or assigned based on various criteria. For example, a talk group may be established for devices associated with a particular public safety agency or department, a particular incident, a particular member role or designation, or a combination thereof. For example, a talk group may relate to an organization of first responders, a group of police officers, a fire incident, or a combination thereof. Similarly, a talk group may relate to members having the same role or designation (for example, police officer, detective, supervisor, paramedic, firefighter, and the like). As another example, paramedics and firefighters might be grouped into two different talk groups even though they are responding to the same public safety incident. As mentioned, in some embodiments, the first dispatch device 115 and the second dispatch device 125 may control talk group affiliations of the communication devices 105. In some embodiments, the dispatch devices 115 and 125 control a talk group affiliation of communication devices within their respective agency. In some embodiments, the dispatch devices 115 and 125 also control a talk group affiliation of communication devices outside their respective agency as explained in greater detail below. For example, in some embodiments, the first dispatch device 115 may control a talk group affiliation of the communication devices 105A, 105B, and 105C.

Figure 2:
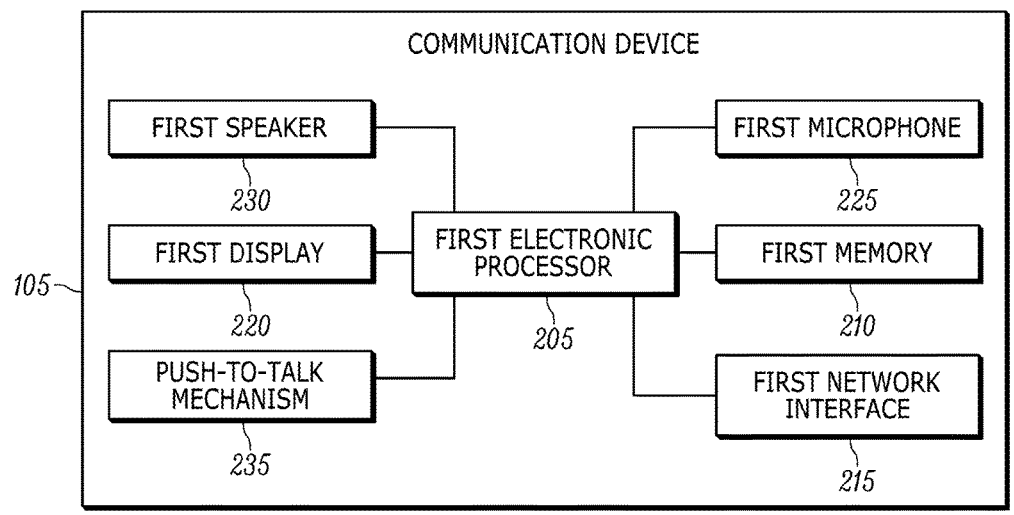
FIG. 2 is a diagram of a communication device included in the communication system of FIG. 1 according to one embodiment.

FIG. 2 is a block diagram of a communication device 105 of the communication system 100 according to one embodiment. In the example shown, the communication device 105 includes a first electronic processor 205 (for example, a microprocessor or another electronic device). The first electronic processor 205 may include input and output interfaces (not shown) and be electrically connected to a first memory 210, a first network interface 215, a first display 220, a first microphone 225, a first speaker 230, and a push-to-talk mechanism 235. In some embodiments, the communication device 105 may include fewer or additional components in configurations different from that illustrated in FIG. 2. For example, in some embodiments, the communication device 105 also includes a camera and a location component (for example, a global positioning system receiver). In some embodiments, the communication device 105 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from the network 120. For example, the first network interface 215 may include a transceiver for wirelessly communicating with the network 120. Alternatively or in addition, the first network interface 215 may include a connector or port for receiving a wired connection to the network 120, such as an Ethernet cable. The first electronic processor 205 receives electrical signals representing sound from the first microphone 225 and may communicate information relating to the electrical signals over the network 120 through the first network interface 215 to other devices, for example, to another communication device 105. Similarly, the first electronic processor 205 may output data received from the network 120 through the first network interface 215, for example from another communication device 105, through the first speaker 230, the first display 220, or a combination thereof.

In some embodiments, the push-to-talk mechanism 235 allows a user of the communication device 105 to initiate communication over the network 120. For example, when the first electronic processor 205 detects that the push-to-talk mechanism 235 is enabled, the first electronic processor 205 communicates sound data detected by the first microphone 225 over the network 120 (for example, as a half-duplex communication signal). In some embodiments, the sound data is communicated to other communication devices that are affiliated with a talk group to which the communication device 105 is broadcasting. When the first electronic processor 205 detects that the push-to-talk mechanism 235 is no longer enabled (for example, has been released), the first electronic processor 205 stops the communication of the sound data. In some embodiments, the push-to-talk mechanism 235 may be a mechanical button or knob or a virtual button or knob displayed on the first display 220, which may include a touchscreen. In some embodiments, the push-to-talk mechanism 235 may be a mechanical button or knob on an accessory that is separate from and communicates with the communication device 105 (for example, a button or knob on a remote speaker-microphone).

As noted, the communication devices 105 may be affiliated with one or more talk groups associated with the network 120. In some embodiments, the communication devices 105 have a level of affiliation with each talk group to which they are affiliated. For example, each communication device 105 may be affiliated with a selected talk group such that when the push-to-talk mechanism 235 is pressed, sound data from the communication device 105 is transmitted to the selected talk group. In some embodiments, the communication device 105 joins any call intended for its selected talk group. All other talk groups that the communication device 105 is affiliated with may be merely for receiving data from other communication devices (in other words, for scanning activity of the other talk groups) and may be referred to as monitored talk groups. In some embodiments, the communication device 105 joins a call intended for one of its monitored talk groups only when its selected talk group does not have a call in progress.

To join a particular talk group (in other words, to configure a particular talk group to be the selected talk group of the communication device 105), the communication device 105 may receive an input representing a user selection of a particular available talk group. For example, the first memory 210 of the communication device 105 may store a list of one or more available talk groups (for example, identifiers of available talk groups with an assigned frequency or channel). The list of available talk groups may be displayed on a user interface of the first display 220. The user interface of the first display 220 may receive an input from a user selecting one of the available talk groups. In some embodiments, available talk groups may be assigned to discrete positions of a rotatable knob or other input mechanisms included on the communication device 105 that receive input from a user selecting one of the positions. The first electronic processor 205 determines the talk group associated with the selected position to select an available talk group. In some embodiments, the communication device 105 receives the list of available talk groups (or a portion thereof including updates thereof) from another device such as the first dispatch device 115, the second dispatch device 125, or a combination thereof.

In some embodiments, the communication device 105 may also join a particular talk group (in other words, have its selected talk group assigned) based on instructions received from the one or more of the dispatch devices 115 and 125 or another device external to the communication device 105. For example, upon arriving at the scene of an incident, the first dispatch device 115 may instruct the communication device 105A to join a talk group associated with the incident. Similarly, as a user of the communication device 105A is assigned to different organizations, departments, or roles, the first dispatch device 115 may instruct the communication device 105A to join a particular talk group associated with these different organizations, departments, or roles. In some embodiments, dispatch devices 115 and 125 may provide a list of talk groups to the communication device 105 and select the selected talk group of the communication device 105 (in other words, instruct the communication device 105 to join a particular talk group).

Figure 3:
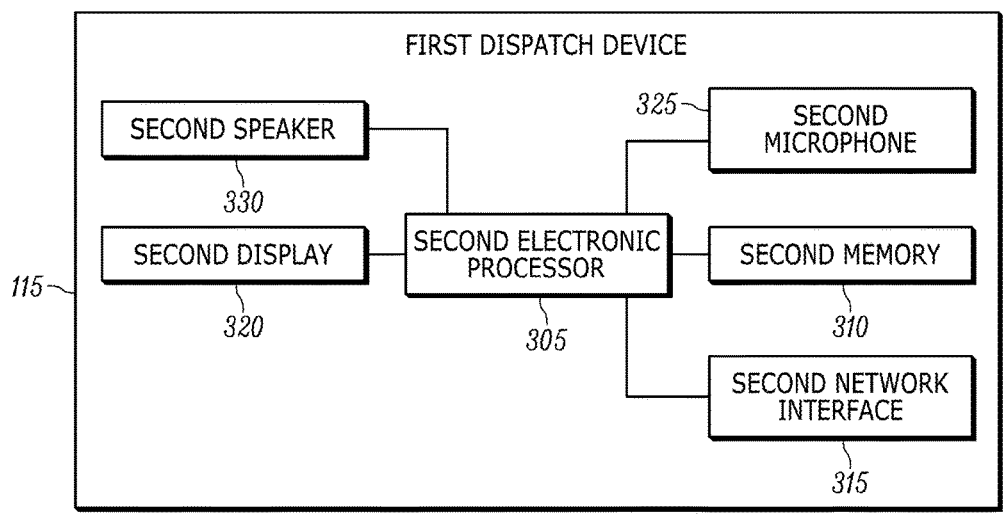
FIG. 3 is a diagram of a first dispatch device included in the communication system of FIG. 1 according to one embodiment.

FIG. 3 is a block diagram of the first dispatch device 115 according to one embodiment. In the example illustrated, the first dispatch device 115 is a computer that includes a second electronic processor 305, an input/output interface (not shown), a second memory 310, a second network interface 315, a second display 320, a second microphone 325, and a second speaker 330. These components are similar to those described above with respect to the communication device 105 and perform similar functions. In some embodiments, the first dispatch device 115 may include fewer or additional components in configurations different from that illustrated in FIG. 3. For example, in some embodiments, the first dispatch device 115 also includes a push-to-talk mechanism similar to that described above with respect to the communication device 105. In some embodiments, the first dispatch device 115 performs additional functionality than the functionality described below.

As noted, in some embodiments, the first dispatch device 115 communicates with communication devices 105 over the network 120, for example, to control talk group affiliations of the communication devices 105. In some embodiments, the first dispatch device 115 monitors the communication devices 105 by receiving characteristics of the communication devices 105 (for example, talk group affiliations, location information, status information, and the like) from the communication devices 105. For example, the location information corresponds to the current location of each communication device 105. As another example, the status information may indicate whether a user of the communication device 105 is currently unavailable (for example, because the user is assisting with an incident) or is currently available to assist with an incident. For example, the second electronic processor 305 may determine that a user is unavailable when the communication device 105 of the user is affiliated with a talk group established to handle an incident. On the other hand, the second electronic processor 305 may determine that the user is available when the communication device 105 of the user is not affiliated with any talk groups established to handle an incident. In other words, the status information indicates whether a communication device 105 is an available communication device. In some embodiments, the status of each communication device 105 may be manually input into the first dispatch device 115 when assigning tasks to users and after the tasks are completed by users. In some embodiments, the above-described characteristics of the communication devices 105 may be stored in the second memory 310 by the second electronic processor 305.

In addition to storing characteristics of the communication devices 105, in some embodiments, the first dispatch device 115 stores control information of the communication devices 105 and role information of the users of the communication devices 105 in the second memory 310. In some embodiments, the control information allows the first dispatch device 115 to communicate with the communication devices 105. For example, the control information may include a network address of the communication device 105, a frequency over which communication with the communication device 105 is to occur, and the like. In some embodiments, the role information includes one or more functions assumed by a person or other thing (for example, a police dog, an ambulance, a firetruck, and the like) during an incident. For example, the role information may include characteristics of the user of the communication device 105 such as experience information and skill information. In some embodiments, the experience information may indicate the number of years of experience that the user has in a role (for example, as a paramedic, as a fire fighter, and the like) or the number of years of experience that the user has in performing a task (for example, handling chemical fires, handling bank robberies, and the like). In some embodiments, the skill information may indicate a particular skill of the user (for example, that the user is a hostage negotiator, is a sharp shooter, has the ability to speak a foreign language, and the like).

The second memory 310 of the first dispatch device 115 also stores subscription information from other agencies (for example, the second agency 130). In some embodiments, the subscription information is mutually-defined between a plurality of agencies and allows the dispatch device of each agency to determine whether and when to contact other agencies for support when handling an incident, as will be described in greater detail below.

In some embodiments, at least some of the information described above as being stored by the second memory 310 (for example, characteristics and control information of the communication devices 105, role information of the users, and subscription information of the agencies) may be stored in a database or other network element that is separate from the first dispatch device 115. In such embodiments, the separate database may communicate with the first dispatch device 115 over the network 120 such that the first dispatch device 115 receives information stored in the separate database.

Figure 4:
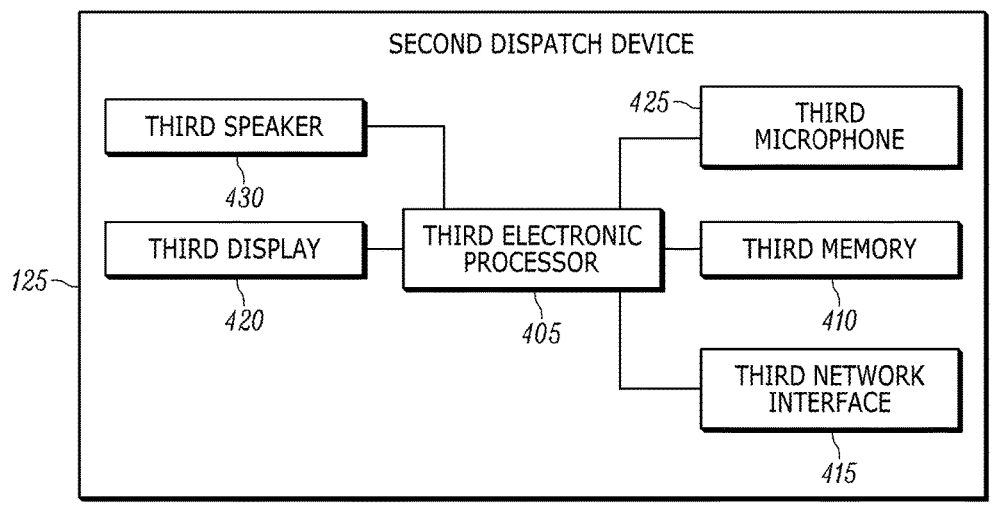
FIG. 4 is a diagram of a second dispatch device included in the communication system of FIG. 1 according to one embodiment.

FIG. 4 is a block diagram of the second dispatch device 125 according to one embodiment. In some embodiments, the second dispatch device 125 is similar to the first dispatch device 115 described previously and includes similar components. For example, the second dispatch device 125 is a computer that includes a third electronic processor 405, an input/output interface (not shown), a third memory 410, a third network interface 415, a third display 420, a third microphone 425, and a third speaker 430. These components are similar to those described above with respect to the communication device 105 and the first dispatch device 115 and perform similar functions as those described with respect to the first dispatch device 115. In some embodiments, the second dispatch device 125 does not include identical components as the first dispatch device 115 and may include fewer or additional components in configurations different from that illustrated in FIG. 4. In some embodiments, the second dispatch device 125 performs additional functionality than the functionality described herein.

As noted previously, public safety personnel of a public safety agency may desire additional assistance from public safety personnel of another public safety agency when handling an incident. To control when the first agency 110 requests additional assistance from other agencies (for example, the second agency 130), the first dispatch device 115 may perform a method 500 illustrated in FIG. 5. In the following descriptions of FIGS. 5 and 6, an example situation is described where an incident is being handled by the first agency 110 (in other words, a controlling agency). The first agency 110 may request additional assistance from the second agency 130 (in other words, an assisting agency). This situation is merely one example. In some embodiments, the first agency 110 may be an assisting agency for another agency, and the second agency 130 may be a controlling agency that requests additional assistance. In some embodiments, a controlling agency may request additional assistance from more than one assisting agency.

Figure 5:
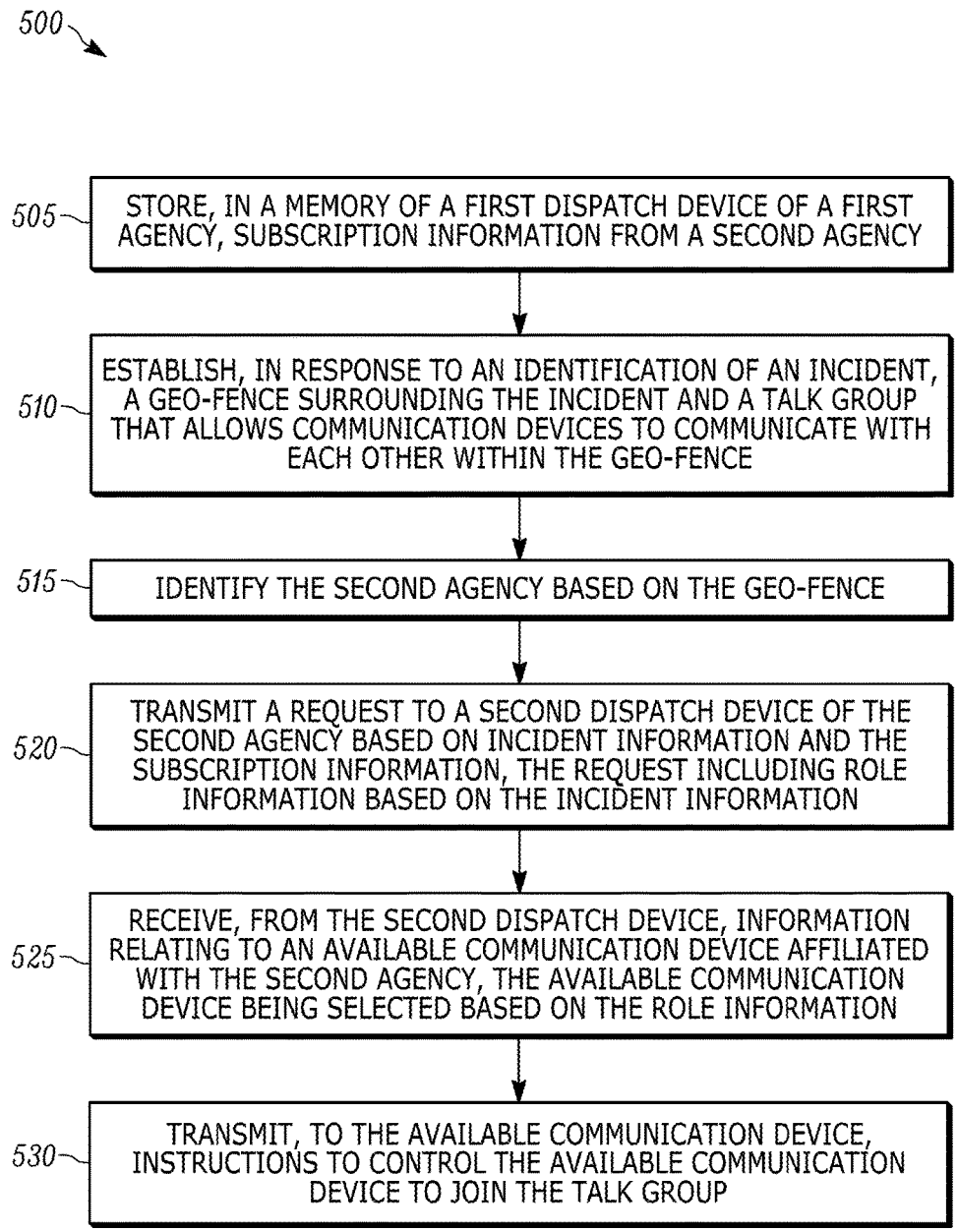
FIG. 5 is a flowchart of a method of controlling inter-agency, incident scene communications performed by the first dispatch device of FIG. 3 according to one embodiment.

FIG. 5 illustrates an example method 500 of controlling inter-agency, incident scene communications from the perspective of a controlling agency. The method 500 is described as being executed by the first dispatch device 115 and, in particular, the second electronic processor 305. However, in some embodiments, the method 500 is performed by the second dispatch device 125 or another device (for example, another computer or one of the communication devices 105).

At block 505, the second electronic processor 305 stores, in the second memory 310 of the first dispatch device 115, subscription information from the second agency 130. In some embodiments, the subscription information from the second agency 130 may be received from the second dispatch device 125 via the second network interface 315. In other embodiments, the subscription information may be manually entered into the first dispatch device 115. In some embodiments, the subscription information from the second agency 130 indicates an incident type and a severity level of an incident for which the second agency 130 is willing and able to provide additional assistance to the first agency 110.

In some embodiments, the incident type of an incident indicates the characteristics of the incident and what type of public safety personnel are needed to respond to the incident. For example, incident types may include fires, vehicle accidents, hostage situations, and the like. In some embodiments, the severity level of the incident indicates the number of public safety personnel required to respond to an incident and may also indicate what type of public safety personnel are required to respond to the incident. For example, a low severity fire (for example, a small fire at an unoccupied building) may require a single fire truck and four firefighters. As another example, a high severity fire (for example, a large fire at an apartment complex) may require multiple fire trucks, over twenty firefighters, and numerous ambulances and paramedics. As yet another example, a medium severity vehicle accident (for example, a single car accident with occupants sustaining minor and major injuries) may require multiple police officers, an ambulance, and multiple paramedics. These incident types and severity levels are examples. In some embodiments, there may be additional or fewer incident types and severity levels. For example, in some embodiments, the severity level may be indicated on a scale from one to ten.

The subscription information from the second agency 130 that is stored in the second memory 310 of the first dispatch device 115 indicates whether the second agency 130 is willing and able to provide additional assistance with an incident being handled by the first agency 110. For example, the subscription information from the second agency 130 may indicate that the second agency 130 is willing and able to provide additional assistance with vehicle accidents and medium and high severity fires but not with hostage situations or low severity fires. In some embodiments, the subscription information from the second agency 130 may be updated to correspond to the current capabilities of the second agency 130. For example, when the second agency 130 has a large number of available firefighters, the second dispatch device 125 may send updated subscription information to the first dispatch device 115 indicating that the second agency 130 is now also willing to provide additional assistance in the event that the first agency 110 begins handling a low severity fire.

At block 510, the second electronic processor 305 establishes, in response to an identification of an incident, a geo-fence surrounding the incident and a talk group that allows communication devices 105 to communicate with each other within the geo-fence. In some embodiments, the second electronic processor 305 identifies the incident and its corresponding location based on at least one of information received from citizens (for example, telephone calls, text messages, and the like), information received from public safety personnel (for example, calls from the communication devices 105, codes transmitted by the communication devices 105, and the like), information received from alarms and sensors (for example, an alarm indicating that a bank robbery is occurring), and the like. In some embodiments, an incident and its location may be manually input into the first dispatch device 115 by a public safety officer who receives a call regarding the incident from a citizen or other public safety personnel. The second electronic processor 305 may establish a geo-fence around the location of the incident (for example, within one hundred yards of the location of the incident, within two miles of the location of the incident, and the like). The second electronic processor 305 then may establish a new talk group that may be used by the communication devices 105 to allow public safety personnel within the geo-fence to communicate with each other.

As mentioned previously, the first dispatch device 115 may transmit information to the communication devices 105 within the geo-fence to indicate that a talk group for the incident is available. Each user may then decide whether to communicate using the talk group for the incident. Also as mentioned previously, in other embodiments, the first dispatch device 115 may control communication devices 105 to join the talk group for the incident upon entering the geo-fence. In some embodiments, the second electronic processor 305 establishes a plurality of talk groups that allow communication devices 105 to communicate with each other within the geo-fence. For example, the second electronic processor 305 may establish a first talk group for firefighters handling the incident, a second talk group for police officers handling the incident, and a third talk group for paramedics handling the incident.

At block 515, the second electronic processor 305 identifies the second agency 130 based on the geo-fence surrounding the incident. In some embodiments, the second electronic processor 305 identifies the second agency 130 by recognizing communication devices 105 from the second agency 130 within or near the geo-fence. In some embodiments, the second electronic processor 305 identifies the second agency 130 based on known geographic areas patrolled by public safety personnel of the second agency 130. For example, the second electronic processor 305 may recognize that the geo-fence overlaps or is located near a neighboring city, county, or other geographic area patrolled by the public safety personnel of the second agency 130.

At block 520, the first dispatch device 115 transmits, from the second network interface 315, a request to the second dispatch device 125 of the second agency 130 based on incident information relating to the incident and the subscription information of the second agency 130. In some embodiments, the request includes role information based on the incident information as described in greater detail below.

In some embodiments, when the incident is identified by the second electronic processor 305 as explained previously, the second electronic processor 305 also determines the incident information of the incident. As described previously with respect to the subscription information of the second agency 130, the incident information includes an incident type and a severity level of the incident. The second electronic processor 305 may determine the incident information of the incident in a similar manner as described previously with respect to identifying when the incident has occurred. For example, the second electronic processor 305 may determine the incident information based on at least one of information received from citizens, information received from public safety personnel, information received from sensors or other devices (for example, fire alarms, smoke detectors, and panic buttons) and the like. In some embodiments, the incident information may be manually input into the first dispatch device 115 by public safety personnel.

In some embodiments, the second electronic processor 305 may determine role information based on the incident information. For example, as described previously, based on the type of the incident and the severity level of the incident, different types of public safety personnel and different amounts of public safety personnel may be required to handle the incident.

In some embodiments, the second electronic processor 305 determines the amount of public safety personnel from the first agency 110 that are currently handling the incident and the roles of these public safety personnel based on information received from the communication devices 105 as described previously. The second electronic processor 305 then determines whether any additional assistance from other agencies is desired by comparing the amount of public safety personnel and their current roles to the incident information. When the second electronic processor 305 determines that additional assistance is desired, the second electronic processor 305 compares the incident information to the subscription information of other agencies that is stored in the second memory 310. When the incident information corresponds to the subscription information from the second agency 130, the second electronic processor 305 controls the second network interface 315 to transmit the request for additional assistance to the second dispatch device 125 (at block 520). Returning to an earlier example, the first dispatch device 115 sends the request for additional assistance to the second agency 130 when the incident information indicates that the incident is a vehicle accident or a medium or high severity fire. However, in this example, the first dispatch device 115 does not send the request for additional assistance to the second agency 130 when the incident is a hostage situation or a low severity fire.

As mentioned, in some embodiments, the request for additional assistance includes role information based on the additional assistance that is desired by the first agency 110 based on the incident information. In other words, based on the comparison of the number of public safety personnel handling the incident and their current roles to the incident information, the first dispatch device 115 sends role information to the second agency 130 that indicates which roles and how many additional public safety personnel of each role are required to handle the incident.

At block 525, the first dispatch device 115 receives, from the second dispatch device 125, information relating to an available communication device affiliated with the second agency 130 (for example, communication device 105C). As will be described in greater detail below with respect to FIG. 6, the third electronic processor 405 of the second dispatch device 125 selects the available communication device based on the role information received from the first dispatch device 115 in the request for additional assistance (see block 520). In some embodiments, the first dispatch device 115 also receives other information relating to the available communication device. For example, the first dispatch device 115 may receive characteristics and control information of the available communication device and role information of the user of the available communication device. In some embodiments, the first dispatch device 115 receives information relating to a plurality of available communication devices affiliated with the second agency 130 as explained in greater detail below.

At block 530, the first dispatch device 115 transmits instructions to the available communication device to control the available communication device to join the talk group for the incident that was previously established (see block 510). The first dispatch device 115 may control the available communication device to join the talk group for the incident in a similar manner as discussed. In some embodiments, the first dispatch device 115 is able to communicate with the available communication device using the control information of the available communication device received from the second dispatch device 125. In some embodiments, the first dispatch device 115 is able to determine the location of the available communication device based on information received from second dispatch device 125.

In some embodiments, at block 530, the first dispatch device 115 transmits information relating to more than one talk group to the available communication device. In other words, the first dispatch device 115 assigns multiple talk groups associated with the incident to the available communication device (for example, a selected talk group and a list of monitored talk groups as explained). In such embodiments, the first dispatch device 115 may select the selected talk group of the available communication device (for example, instruct the available communication device to join a particular talk group for the incident). In alternate embodiments, the user of the available communication device may choose which talk group to use as the selected talk group. In some embodiments, the first dispatch device 115 may change the selected talk group of the available communication device, for example, based on at least one of incident information and role information.

Figure 6:
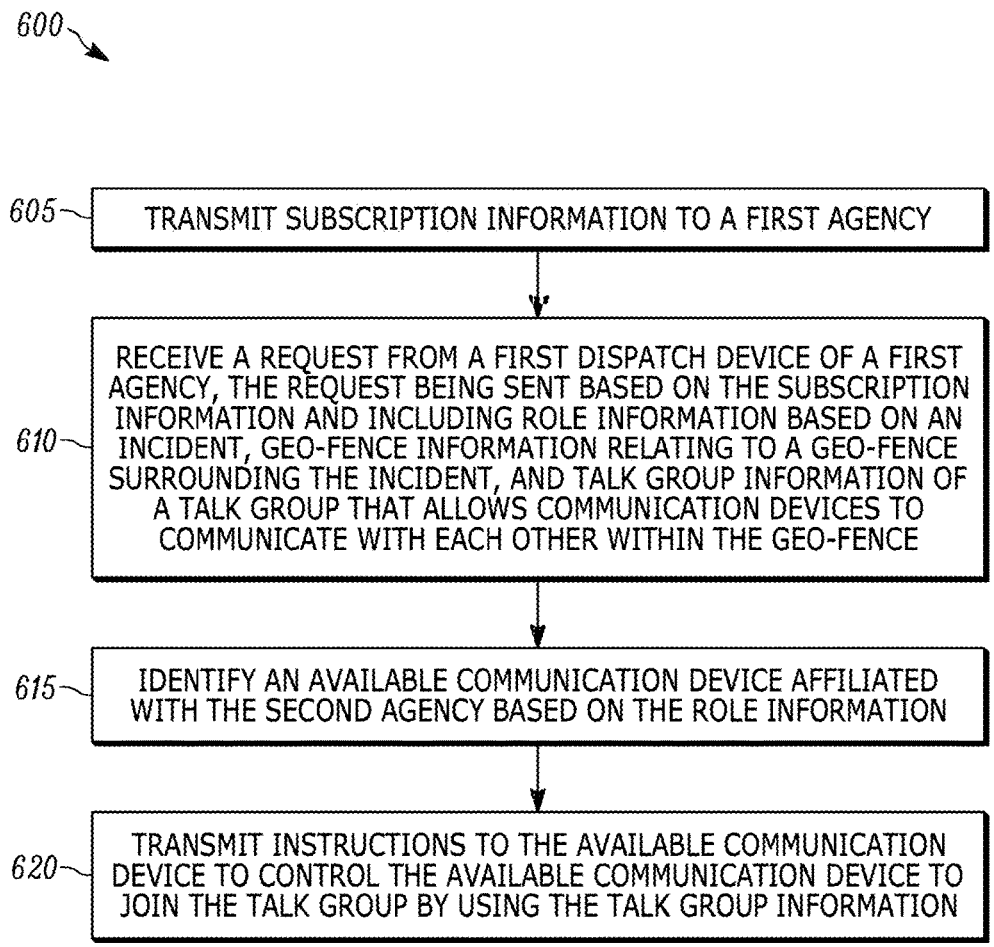
FIG. 6 is a flowchart of a method of controlling inter-agency, incident scene communications performed by the second dispatch device of FIG. 4 according to one embodiment.

FIG. 6 illustrates an example method 600 of controlling inter-agency, incident scene communications from the perspective of an assisting agency. As mentioned, in the example illustrated in FIGS. 5 and 6, the second agency 130 is the assisting agency. Accordingly, the method 600 is described as being executed by the second dispatch device 125 and, in particular, the third electronic processor 405. However, in some embodiments, the method 600 is performed by the first dispatch device 115 or another device (for example, another computer or one of the communication devices 105).

At block 605, the second dispatch device 125 transmits subscription information to the first agency 110, and in particular, the first dispatch device 115. In some embodiments, the second dispatch device 125 transmits the subscription information via the third network interface 415. As described, the first dispatch device 115 stores the subscription information from the second agency 130 in the second memory 310 (see block 505 of FIG. 5).

At block 610, the second dispatch device 125 receives a request from the first dispatch device 115 based on the subscription information as explained previously (see block 520 of FIG. 5). In some embodiments, the request includes role information based on the incident being handled by the first agency 110 as explained previously. For example, the role information may indicate which roles and how many additional public safety personnel of each role are being requested by the first agency 110. In some embodiments, the request from the first dispatch device 115 also includes geo-fence information relating to the geo-fence surrounding the incident being handled by the first agency 110. From the geo-fence information, the third electronic processor 405 is able to identify communication devices 105 affiliated with the second agency 130 that are located within or near the geo-fence. In some embodiments, the request from the first dispatch device 115 also includes talk group information of the talk group established by the first dispatch device 115 (see block 510 of FIG. 5). For example, the talk group information may include an identifier of the talk group such as an assigned frequency or channel over which talk group communications occur, a password to enter the talk group, and the like.

At block 615, the third electronic processor 405 identifies an available communication device affiliated with the second agency 130 based on the role information received in the request from the first dispatch device 115. For example, as explained previously, the second dispatch device 125 stores information about and monitors the status of the communication devices 105 of the second agency 130 (in other words, communication devices 105C and 105D). In response to receiving the request for additional assistance from the first dispatch device 115, the third electronic processor 405 determines which communication devices 105 of the second agency 130 are available and operated by users that match the role information received from the first dispatch device 115. Such communication devices may be referred to as qualifying communication devices.

In some embodiments, the third electronic processor 405 identifies the available communication device from among the qualifying communication devices based on at least one of location information, experience information, and skill information as described. For example, the third electronic processor 405 may identify the closest communication device to the geo-fence as the available communication device. As another example, the third electronic processor 405 may identify the available communication device based on the communication device being located within the geo-fence. As another example, the third electronic processor 405 may identify the available communication device based on a user associated with the available communication device having the most experience in performing a task (for example, handling chemical fires, handling bank robberies, and the like). As yet another example, the third electronic processor 405 may identify the available communication device based on a user associated with the available communication device having a particular skill (for example, hostage negotiation skills, sharp shooting skills, foreign language capabilities, and the like).

At block 620, the second dispatch device 125 transmits instructions to the available communication device to control the available communication device to join the talk group established by the first dispatch device 115. In some embodiments, the second dispatch device 125 uses the talk group information received from the first dispatch device 115 to control the available communication device to join the talk group. The second dispatch device 125 may control the available communication device to join the talk group in a similar manner as described previously.

In some embodiments, the second dispatch device 125 transmits information relating to the available communication device to the first dispatch device 115 as described previously (see block 525 of FIG. 5). In some embodiments, the second dispatch device 125 transmits information relating to a plurality of available communication devices (in other words, a list of qualifying communication devices) to the first dispatch device 115. In such embodiments, the second electronic processor 305 of the first dispatch device 115 determines which qualifying communication devices to include in the talk group. For example, using information related to the qualifying communication devices from the second dispatch device 125, the second electronic processor 305 may make such a determination in a similar manner as described with respect to the third electronic processor 405 of the second dispatch device 125 (for example, based on at least one of location information, experience information, and skill information associated with each of the qualifying communication devices). In such embodiments, the first dispatch device 115 may transmit a selection of the available communication device to include in the talk group to the second dispatch device 125. The second dispatch device 125 may then control the selected available communication device to join the talk group as described previously.

In other embodiments, the second dispatch device 125 selects the available communication device from among the qualifying communication devices of the second agency 130. In such embodiments, the second dispatch device 125 may control the available communication device to join the talk group as described previously. In some embodiments where the second dispatch device 125 controls the available communication device to join the talk group for the incident, the second dispatch device 125 sends a confirmation to the first dispatch device 115 that the available communication device has joined the talk group. This confirmation prevents the first dispatch device 115 from requesting additional assistance (for example, from another agency) when the requested role has already been filled by the available communication device.

As explained previously with respect to block 530, in some embodiments, at block 620, the second dispatch device 125 transmits information relating to more than one talk group to the available communication device. In other words, the second dispatch device 125 assigns multiple talk groups associated with the incident to the available communication device (for example, a selected talk group and a list of monitored talk groups as explained previously). In such embodiments, the second dispatch device 125 may select the selected talk group of the available communication device (for example, instruct the available communication device to join a particular talk group for the incident). In alternate embodiments, the user of the available communication device may choose which talk group to use as the selected talk group. In some embodiments, the second dispatch device 125 may change the selected talk group of the available communication device, for example, based on at least one of incident information and role information.

In some embodiments, the second electronic processor 305 of the first dispatch device 115 establishes a second talk group that allows communication devices 105 to communicate with each other within the geo-fence. In such embodiments, the first dispatch device 115 or the second dispatch device 125 may select a second available communication device from the plurality of available communication devices (in other words, from the qualifying communication devices of the second agency 130) based on the role information as described. For example, one of the dispatch devices 115 and 125 may select the second available communication device when the role information of the second available communication device matches the desired role information of the first agency 110 in the request for additional assistance. In some embodiments, one of the dispatch devices 115 and 125 transmits instructions to control the second available communication device to join the second talk group as described with respect to the first talk group (see block 530 of FIG. 5). In some embodiments, one of the dispatch devices 115 and 125 selects multiple available communication devices to join a single talk group.

In some embodiments, the first dispatch device 115 stores second subscription information from a third agency in the second memory 310. In some embodiments, the second subscription information of the third agency is different than the subscription information from the second agency 130. The second subscription information may indicate that the third agency is willing and able to provide additional assistance with only high severity fires and not hostage situations, vehicle accidents, or low or medium severity fires.

In response to the identification of the incident, the second electronic processor 305 of the first dispatch device 115 determines whether to send the request for additional assistance to the second agency 130 based on a comparison of the subscription information from the second agency 130 to the incident information of the incident. The second electronic processor 305 also determines whether to send a second request for additional assistance to the third agency based on a second comparison of the second subscription information from the third agency to the incident information. For example, the second electronic processor 305 sends a request to both the second agency 130 and the third agency when the incident is a high severity fire (because the incident information corresponds with the subscription information from both the second agency 130 and the third agency). However, when the incident is a vehicle accident, the second electronic processor 305 sends a request to the second agency 130 but not the third agency (because the incident information only corresponds to the subscription information from the second agency 130). Continuing this example, when the incident is a hostage situation, the second electronic processor 305 does not send a request to either the second agency 130 or the third agency (because the incident information does not correspond to the subscription information from either agency).

In some situations, the incident information may change as details of the incident change. For example, a medium severity fire may spread such that the second electronic processor 305 identifies the incident as a high severity fire (in other words, a change in severity level of the incident). As another example, a fire that was not originally identified as a chemical fire may spread to an area such that the second electronic processor 305 identifies the fire as a chemical fire (in other words, a change in a type of the incident).

In response to at least one condition of the incident changing, the second electronic processor 305 determines updated incident information of the incident. In some embodiments, the first dispatch device 115 transmits a second request to the third agency when the updated incident information corresponds to the second subscription information from the third agency. For example, the first dispatch device 115 does not send a request to the third agency when the incident is a medium severity fire. However, when the updated information indicates the incident has escalated to a high severity fire, the first dispatch device 115 sends the second request to the third agency. The second request includes second role information based on the updated incident information that is similar to the role information described previously (similar to block 520 of FIG. 5). In some embodiments, the first dispatch device 115 receives, from a third dispatch device of the third agency, information relating to a second available communication device of the third agency (similar to block 525 of FIG. 5). In some embodiments, the second available communication device is selected based on the second role information described previously (similar to block 615 of FIG. 6). In some embodiments, the first dispatch device 115 transmits instructions to the second available communication device to control the second available communication device to join the talk group as explained above (similar to block 530 of FIG. 5).

In some embodiments, when the second electronic processor 305 determines updated incident information of the incident, the first dispatch device 115 sends an updated request to the second dispatch device 125 of the second agency 130. The updated request is similar to the request for additional assistance discussed above and may include updated role information based on the updated incident information. For example, the first agency 110 may have only initially requested two additional firefighters to assist with a medium severity fire. However, when the updated incident information indicates that the fire has escalated to a high severity fire, the first dispatch device 115 may send the updated request for ten additional firefighters. In a similar manner as described with respect to the initial request, the first dispatch device 115 can receive information relating to available communication devices (see block 525 of FIG. 5) and control available communication devices to join a talk group for the incident (see block 530 of FIG. 5).

In some embodiments, one of the dispatch devices 115 and 125 transmits the geo-fence information of the incident to the available communication device. In such embodiments, the available communication device may use the geo-fence information to direct a user of the available communication toward the location of the incident.

The situation described previously is merely an example. In some embodiments, the first dispatch device 115 stores subscription information from additional agencies. In some embodiments, the first dispatch device 115 establishes additional talk groups that allow communication devices 105 to communicate within the geo-fence. In some embodiments, the first dispatch device 115 controls available communication devices of other agencies to join multiple talk groups. In some embodiments, the first dispatch device 115 controls multiple available communication devices from another agency or from multiple other agencies to join one or more talk groups established by the first dispatch device 115.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of controlling inter-agency, incident scene communications, the method comprising:
    storing, in a memory of a first dispatch device of a first agency, subscription information from a second agency, the subscription information including a first severity level indicating an ability of the second agency to provide assistance to the first agency;
    establishing, in response to an identification of an incident and with an electronic processor of the first dispatch device, a geo-fence surrounding the incident and a talk group that allows communication devices to communicate with each other within the geo-fence;
    identifying, with the electronic processor, the second agency based on the geo-fence;
    determining, with the electronic processor, a second severity level of the incident;
    comparing, with the electronic processor, the second severity level of the incident to the first severity level;
    determining, with the electronic processor, that the second severity level of the incident corresponds to the first severity level;
    transmitting, from a network interface of the first dispatch device and in response to determining that the second severity level of the incident corresponds to the first severity level, a request to a second dispatch device of the second agency, the request including role information;
    receiving, via the network interface of the first dispatch device from the second dispatch device, information relating to an available communication device affiliated with the second agency, the available communication device being selected based on the role information; and
    transmitting, by the network interface of the first dispatch device to the available communication device, instructions to control the available communication device to join the talk group.

2. The method of claim 1, wherein receiving the information relating to the available communication device includes receiving, via the network interface of the first dispatch device from the second dispatch device, information relating to a plurality of available communication devices affiliated with the second agency, the information including at least one of the group consisting of location information, experience information, and skill information.

3. The method of claim 2, further comprising:
    selecting the available communication device from the plurality of available communication devices based on at least one of the group consisting of the location information, the experience information, and the skill information.

4. The method of claim 3, further comprising:
    establishing a second talk group that allows communication devices to communicate with each other within the geo-fence;
    selecting a second available communication device from the plurality of available communication devices based on the role information of the second available communication device; and
    transmitting, by the network interface of the first dispatch device to the second available communication device, second instructions to control the second available communication device to join the second talk group.

5. The method of claim 1, further comprising:
    storing, in the memory of the first dispatch device, second subscription information from a third agency, the second subscription information including a third severity level indicating an ability of the third agency to provide assistance to the first agency, the third severity level being different than the first severity level of the second agency;
    and
    determining, in response to the identification of the incident and with the electronic processor of the first dispatch device, whether to send a second request to the third agency based on a comparison of the second severity level of the incident to the third severity level.

6. The method of claim 5, further comprising:
    determining, with the electronic processor of the first dispatch device, that the second severity level of the incident corresponds to the third severity level; and transmitting, from the network interface of the first dispatch device, the second request to a third dispatch device of the third agency in response to determining that the second severity level of the incident corresponds to the third severity level, the second request including second role information.

7. The method of claim 6, further comprising:
receiving, via the network interface of the first dispatch device from the third dispatch device, information relating to a second available communication device affiliated with the third agency, the second available communication device being selected based on the second role information; and
transmitting, by the network interface of the first dispatch device to the second available communication device, second instructions to control the second available communication device to join the talk group.

8. The method of claim 5, further comprising:
determining, with the electronic processor of the first dispatch device, that the second severity level of the incident does not correspond to the third severity level;
determining, with the electronic processor of the first dispatch device, an updated severity level of the incident in response to at least one condition of the incident changing;
determining, with the electronic processor of the first dispatch device, that the updated severity level of the incident corresponds to the third severity level; and
transmitting, from the network interface of the first dispatch device, the second request to a third dispatch device of the third agency in response to determining that the updated severity level of the incident corresponds to the third severity level, the second request including updated role information.

9. The method of claim 8, further comprising:
receiving, via the network interface of the first dispatch device from the third dispatch device, information relating to a second available communication device affiliated with the third agency, the second available communication device being selected based on the updated role information; and
transmitting, by the network interface of the first dispatch device to the second available communication device, second instructions to control the second available communication device to join the talk group.

10. The method of claim 1, further comprising:
receiving, via the network interface of the first dispatch device from the second dispatch device, an updated first severity level; and
storing, in the memory of the first dispatch device, the updated first severity level.

11. The method of claim 1, further comprising identifying, with a second electronic processor of the second dispatch device, the available communication device based on the role information.

12. A first dispatch device of a first agency, the first dispatch device comprising:
a memory configured to store subscription information from a second agency, the subscription information including a first severity level indicating an ability of the second agency to provide assistance to the first agency;
a network interface configured to communicate with a second dispatch device of the second agency; and
an electronic processor configured to
establish, in response to an identification of an incident, a geo-fence surrounding the incident and a talk group that allows communication devices to communicate with each other within the geo-fence,
identify the second agency based on the geo-fence,
determine a second severity level of the incident,
compare the second severity level of the incident to the first severity level,
determine that the second severity level of the incident corresponds to the first severity level,
transmit, via the network interface and in response to determining that the second severity level of the incident corresponds to the first severity level, a request to the second dispatch device, the request including role information,
receive, via the network interface from the second dispatch device, information relating to an available communication device affiliated with the second agency, the available communication device being selected based on the role information, and
transmit instructions, via the network interface, to the available communication device to control the available communication device to join the talk group.

13. The first dispatch device of claim 12, wherein the electronic processor is further configured to
receive information relating to a plurality of available communication devices affiliated with the second agency, the information including at least one of the group consisting of location information, experience information, and skill information; and
select the available communication device from the plurality of available communication devices based on at least one of the group consisting of the location information, the experience information, and the skill information.

14. The first dispatch device of claim 13, wherein the electronic processor is further configured to
establish a second talk group that allows communication devices to communicate with each other within the geo-fence;
select a second available communication device from the plurality of available communication devices based on the role information of the second available communication device; and
transmit second instructions, via the network interface, to the second available communication device to control the second available communication device to join the second talk group.

15. The first dispatch device of claim 12, wherein the electronic processor is further configured to
store second subscription information from a third agency in the memory, the second subscription information including a third severity level indicating an ability of the third agency to provide assistance to the first agency, the third severity level being different than the first severity level of the second agency;
and
determine, in response to the identification of the incident, whether to send a second request to the third agency based on a comparison of the second severity level of the incident to the third severity level.

16. The first dispatch device of claim 15, wherein the electronic processor is further configured to
determine that the second severity level of the incident corresponds to the third severity level; and
transmit, via the network interface, the second request to a third dispatch device of the third agency in response to determining that the second severity level of the incident corresponds to the third severity level, the second request including second role information.

17. The first dispatch device of claim 16, wherein the electronic processor is further configured to
   receive, via the network interface from the third dispatch device, information relating to a second available communication device affiliated with the third agency, the second available communication device being selected based on the second role information; and
   transmit, via the network interface to the second available communication device, second instructions to control the second available communication device to join the talk group.

18. The first dispatch device of claim 15, wherein the electronic processor is further configured to
   determine that the second severity level of the incident does not correspond to the third severity level;
   determine an updated severity level of the incident in response to at least one condition of the incident changing;
   determine that the updated severity level of the incident corresponds to the third severity level;
   transmit, via the network interface, the second request to a third dispatch device of the third agency in response to determining that the updated severity level of the incident corresponds to the third severity level, the second request including updated role information;
   receive, via the network interface from the third dispatch device, information relating to a second available communication device affiliated with the third agency, the second available communication device being selected based on the updated role information; and
   transmit second instructions, via the network interface, to the second available communication device to control the second available communication device to join the talk group.

19. The first dispatch device of claim 12, further comprising a second electronic processor of the second dispatch device, wherein the second electronic processor identifies the available communication device based on the role information.

20. The first dispatch device of claim 12, wherein the electronic processor is further configured to
   receive, via the network interface from the second dispatch device, an updated first severity level; and
   store the updated first severity level in the memory.

* * * * *